United States Patent
Maes (10) Patent No.: US 10,948,735 B2
(45) Date of Patent: Mar. 16, 2021

(54) SYSTEM AND METHOD FOR ENHANCED IMAGE PROJECTION

(71) Applicant: BARCO N.V., Kortrijk (BE)

(72) Inventor: Dirk Maes, Wevelgem (BE)

(73) Assignee: BARCO N.V., Kortrijk (BE)

( * ) Notice: Subject to any disclaimer, the term of this patent is extended or adjusted under 35 U.S.C. 154(b) by 78 days.

(21) Appl. No.: 16/482,425

(22) PCT Filed: Feb. 3, 2017

(86) PCT No.: PCT/EP2017/052440
§ 371 (c)(1),
(2) Date: Jul. 31, 2019

(87) PCT Pub. No.: WO2018/141407
PCT Pub. Date: Aug. 9, 2018

(65) Prior Publication Data
US 2020/0249492 A1    Aug. 6, 2020

(51) Int. Cl.
*G03B 21/20* (2006.01)
*G02B 27/48* (2006.01)
(Continued)

(52) U.S. Cl.
CPC ......... *G02B 27/48* (2013.01); *G02B 27/1006* (2013.01); *G02B 27/1026* (2013.01); *G03B 21/005* (2013.01); *G03B 21/208* (2013.01); *G03B 21/2013* (2013.01); *G03B 21/2066* (2013.01)

(58) Field of Classification Search
CPC .... G03B 21/14; G03B 21/005; G03B 21/006; G03B 21/008; G03B 21/2013; G03B 21/2066; G02B 27/48; G02B 27/1026; G02B 27/1033; G02B 27/1006; H04N 9/31; H04N 9/3102; H04N 9/3108
See application file for complete search history.

(56) References Cited

U.S. PATENT DOCUMENTS 5,978,142 A   11/1999   Blackham
6,094,294 A    7/2000   Yokoyama
(Continued)

FOREIGN PATENT DOCUMENTS

CA   2884903      4/2015
DE   19812803    10/1999
(Continued)

OTHER PUBLICATIONS

International Preliminary Report on Patentability in corresponding PCT Application No. PCT/EP2017/052440, dated Aug. 6, 2019.
(Continued)

*Primary Examiner* — William C. Dowling
(74) *Attorney, Agent, or Firm* — Bacon & Thoams, PLLC (57) ABSTRACT

A system and method for projecting images including an illumination light beam (emitted by a source) and a collimated light beam (emitted by a laser source). The two light beams being combined into one light via a microlens array combined with a pinhole matrix located in the focal plane of the microlens array. The collimated beam is transmitted through this array and the base beam is reflected therefrom.

20 Claims, 4 Drawing Sheets

(51) Int. Cl.
*G02B 27/10* (2006.01)
*G03B 21/00* (2006.01)

(56) References Cited

U.S. PATENT DOCUMENTS

| | | | |
|---|---|---|---|
| 8,628,199 B2* | 1/2014 | Akiyama | G03B 21/208 353/94 |
| 2002/0135825 A1 | 9/2002 | Lee | |
| 2007/0002453 A1 | 1/2007 | Munro | |
| 2012/0242960 A1 | 9/2012 | Oiwa | |
| 2015/0036057 A1 | 2/2015 | Richards | |
| 2016/0357094 A1 | 12/2016 | Ishii | |
| 2020/0249449 A1* | 8/2020 | Okuno | G02B 13/16 |

FOREIGN PATENT DOCUMENTS

| | | |
|---|---|---|
| EP | 1074882 | 2/2001 |
| EP | 2503378 | 9/2012 |
| FR | 2793043 | 11/2000 |
| WO | 2006043237 | 4/2006 |
| WO | 2010125367 | 11/2010 |
| WO | 2012139634 | 10/2012 |
| WO | 2012145200 | 10/2012 |
| WO | 2015041196 | 3/2015 |
| WO | 2015172236 | 11/2015 |
| WO | 20150200138 | 12/2015 |

OTHER PUBLICATIONS

International Search Report and Written Opinion in corresponding PCT/EP2017/052440, dated Jan. 23, 2018.
Partial Search Report in corresponding PCT/EP2017/052440, dated Nov. 17, 2017.
Hoskinson and Stoeber, "High-Dynamic Range image projection using an auxiliary MEMS mirror array," Optical Society of America, 2008.

* cited by examiner

SYSTEM AND METHOD FOR ENHANCED IMAGE PROJECTION

FIELD OF THE INVENTION

The present invention relates to image projection methods and systems thereof, comprising combining light beams with different characteristics as well as optical arrangements that can be used to combine light beams in projectors.

BACKGROUND OF THE INVENTION

Conventional projectors are based on so called light valve technology. The entire light valve is uniformly illuminated and the light valve blocks the light in regions where no light is needed. The light valve can be implemented with e.g. LCD (Liquid Crystal Display), DLP (Digital Light Processing) or LCOS (Liquid Crystal On Silicon). Disadvantages can be e.g. that for an average video signal, a significant amount of light energy is wasted, or it is not possible to completely block light so that a minor amount of light is leaking resulting in grey instead of black.

Currently there is a desire for displays, including projection displays, to be capable of producing a wider dynamic range, which can be referred to as High Definition Range, HDR. This can for example mean obtaining darker black levels and higher peak brightness levels. An imaging system with HDR can provide more details in black and a more adequate representation of the image highlights. It is however not the intention that the average picture brightness is much increased since this can force eye adaptation to a higher level (which might be painful) and still not benefit the perceived dynamic range. When increasing peak brightness, the black level is also raised. Since more information is encoded near black, this is highly undesirable.

A cascade of two light valves has been proposed by SEOS in U.S. Pat. No. 5,978,142. While this approach can be effective to lower the light leakage in black, it affects the light throughput efficiency as losses in the first light valve, the imaging optics, mirrors, etc., may reduce the peak brightness by up to 50%. Further in a typical HDR signal, the ratio between peak brightness and average brightness is often larger, so in this case even more of the light energy will be blocked.

Thus, a more efficient approach towards an HDR projector is to have a first modulator distributing light onto a second modulator, only at the location where it is needed. The second modulator can be of a conventional "light valve type". This principle is sometimes referred to as "light steering" wherein the light steering beam is often more collimated than a conventional illumination light beam. For the same amount of illumination light input, this solution can deliver darker black and lighter white and thus a higher contrast ratio.

An approach where the first modulator is based on a phase modulating LCOS device has been proposed by Light Blue Optics in WO2010125367A. MTT Innovation discloses LCoS phase modulators for beam steering i.e. in CA2884903. Another approach, where an analogue MEMS (Micro Electro Mechanical Systems) device is used as the first modulator, is described by Hoskinson and Stoeber: *"High-dynamic range image projection using an auxiliary MEMS mirror array"*, Optical Society of America, 2008. A benefit with the use of MEMS is that the light steering becomes wavelength independent. It is possible to modulate multiple wavelengths in one primary colour light beam (e.g. for despeckling purposes) and/or multiple primary colour light beams (e.g. for dealing with white light).

Patent application WO2015172236 suggests combining a conventional low dynamic range projector with a single amplitude modulator with a high dynamic range projector using a phase modulator in combination with an amplitude modulator. These two projector systems can each deliver an image through its respective projection lens, and the images can be overlaid on the same projection screen, thus, the output of the two projectors is superposed.

However, such dual projector systems face a number of challenges. For example, it is difficult to overlay the two images with sub-pixel accuracy on the screen, e.g. due to that
- differences in lens distortions can create misalignment,
- if the projectors are physically placed on top of one another and one of the projectors is tilted to bring the centre of the two images into alignment, keystone distortion might appear, which arises from projecting onto an angled surface, the correction requires extensive vertical lens shift,
- in cinemas with side curtains, it is common practice to use a different lens zoom factor to switch between flat and cinemascope format, and normal precision of zoom encoding to switch both projectors over between these formats and still maintain subpixel accuracy, will not be sufficient.

Further, when using a gain screen, the summed brightness becomes unpredictable due to the offset between the projection lenses. When using a single projector on a gain screen, it is normal to observe a hotspot when projecting a white field. For every observer position, the position of this hotspot on the screen is different. If the gain is modest, the roll-off is gradual and overall the image remains acceptable. With two projectors, however, each projector has a hotspot in a different location on the screen. But the position of the two spots depends on the observer position, so how the brightness of a first projector will sum with the brightness of a second projector is different for every observer. It is therefore recommended to minimize the offset between the two projectors. If the projectors are rather big, this can be accomplished by folding mirrors, however, such folding mirrors add complexity, and stability of the mirrors is critical (a small movement could easily displace the image on the screen over multiple pixels).

Also, in a cinema application, every accessible image signal has to be encrypted, thus providing an input signal to both projectors is not a matter of simple signal splitting. A special dual output playout server is required, with individual encryption on each output. If the playout server is integrated inside the projector also this part will need to be entirely duplicated and frame accurate synchronization is required between the two playout servers.

Next to this, the use of two independent projectors results in a duplication of the number of components, for example: the projection lens, the amplitude modulation stage, the input signal processing block (including content decryption) and the housing.

It is therefore more advantageous to use an implementation where a main light source (or base illumination light source) and boost light source (or steered light source or collimated light source) are provided inside a single projector. The boost light source illuminates the phase modulator in order to create the light fields. Those light fields are combined with the uniform flat field of the main light source to deliver the final illumination of the amplitude modulator.

However, when the two light beams are combined by illuminating the spatial light modulator at a different angle as suggested in WO2012145200, other complications arise:

The étendues of the two light sources are added and is increased if there is a gap in between the two light beams. The spatial light modulator has a limited étendue and both light beams need to fall within the acceptance angle of the spatial light modulator.

Any vignetting in the optical system after the combination (such as typically happens in a DLP color combining prism) will affect the light from the boost light source differently than light from the base illumination light source, this can in total result in brightness and color artefacts, as in the picture the balance between base illumination and light steered illumination is dynamic.

Light from the boost light source has different angular characteristics then the light coming from the base illumination light source, which can result in:

The light from the light steering will exit the projection lens as a point source, creating a serious laser safety hazard.

When using laser light, the superposition of different (coherent) light beams onto the highlight position will result in interference patterns, also known as objective speckle. Since there is no angular diversity introduced in the light originating from the light steering, the laser speckle level will be unacceptably high.

SUMMARY OF THE INVENTION

An aim of the present invention is to achieve any, some or all of the following:

to control étendues of light emitted from light sources. A spatial light modulator has a limited étendue and it is preferred if light beams fall within the acceptance angle of the spatial light modulator;

to reduce vignetting in the optical system after a combination of light beams;

to control light beams with different angular characteristics;

to control light exiting the projection lens to reduce laser safety hazards;

to reduce speckle in a projected image.

It is an objective of the present invention to provide a system for combining light for a projection system comprising a first light source providing a base illumination light beam, a second light source providing a collimated light beam, a micro-lens array for providing angular diversity to the collimated light beam, and a transmissive-reflective means for combining the base illumination light beam and the collimated light beam into a combined beam. The micro-lens array can be positioned in the optical path of the second light source, before the transmissive-reflective means. The transmissive-reflective means can comprise areas that can reflect the base illumination light beam, and also areas that can transmit the light of the collimated light beam.

This has the advantage of being able to diffuse the collimated beam and blended with the illumination beam without having to diffuse and further broaden the illumination beam.

Additionally, the system can comprise a despeckling device for despeckling the collimated light beam. Additionally, this device can at least partly be provided by the micro-lens array which can be stationary or moving.

This has the advantage of reducing speckle formation.

Additionally or alternatively, the focus point of each micro-lens of the micro-lens array can lie within the plane of the transmissive parts of the transmissive-reflective means. Additionally, the focus point of each micro-lens can be aligned with the transmissive parts of the transmissive-reflective means.

This has the advantage of minimizing unwanted disturbance of the collimated light beam.

Additionally or alternatively, the transmissive-reflective means can comprise a pinhole mirror that has a transmissive or opaque substrate with a reflective coating on the first side, and pinholes through the substrate and/or coating. Each pinhole can be associated with a micro-lens of the micro-lens array. Additionally, the micro-lens array and the transmissive-reflective means can be arranged such that the focus position of each micro-lens is in its associated pinhole. Additionally, the diameter of the pinholes can be at least two times or at least three times smaller than the distance between two adjacent pinholes and of at least the projection of the Airy disk in the plane of the transmissive-reflective means corresponding to the longer wavelength of the collimated light beam. Additionally, the pinholes can be configured to filter out higher diffraction orders of the collimated light beam.

Additionally or alternatively, the micro-lens array can be configured such that the étendue of the collimated light beam transmitted through the transmissive-reflective means is equal to- or smaller than the étendue of the base illumination light beam reflected by the transmissive-reflective means. Additionally or alternatively, the micro-lens array can be configured to expand the étendue of the collimated light beam until the étendue of the collimated light beam is equal to- or smaller than the total étendue of the reflected illumination light beam.

This has the advantage of reducing light losses.

Additionally or alternatively, the illumination light beam can impinge onto the transmissive-reflective means at a normal or near normal angle, or at an angle, preferably in the range of 20 to 35 degrees.

Additionally or alternatively, the system can comprise a first spatial light modulator for modulating the light beam of the collimated beam before the micro-lens array. Additionally or alternatively, there can be a second spatial light modulator for modulating the combined light beam.

This has the advantage of that the collimated light beam can be modulated independently of the base illumination light beam.

Additionally or alternatively, the system can comprise a first TIR prism (28) arranged in the optical path of the combined beam such that the combined beam (40) is reflected by the TIR surface of the TIR prism (28). Additionally, the system can comprise illumination imaging optics (41) and a second TIR prism (42) arranged such that the combined beam is reflected by the TIR surface of a second TIR prism (42). Additionally, the first and second TIR prism can be arranged anti-symmetrically with respect to an axis perpendicular to the optical axis between the two prisms.

Additionally or alternatively, the second spatial light modulator (43) is arranged such that the combined beam reflected by the TIR surface of the second TIR prism reaches the spatial light modulator at an angle corresponding to the incidence angle of the base illumination light beam on the transmissive-reflective means. Additionally or alternatively, a projection lens can be arranged such that the beam reflected by the spatial light modulator (43) reaches the projection lens.

Thus the plane of the transmissive-reflective means can be kept in parallel with the plane of the light modulator, and this has the advantage of that the focus can be kept uniform throughout the image.

Additionally or alternatively, the illumination light beam can be focused onto the second light modulator, and the micro-lens array can be further configured to keep the collimated light beam out of focus in said plane.

Additionally or alternatively, the transmissive-reflective means can comprise a blazed micro-mirror having angled transmissive- and reflective surfaces defined by a blazed angle. Additionally, the blaze angle can be chosen to be identical to the tilt angle of the micro-mirrors of the second modulator.

This has the advantage of allowing the incoming collimated light and the outgoing combined beam to be parallel to the optical axis, which can be beneficial for e.g. certain light modulators.

Additionally or alternatively, the resolution of the micro-lens array is at least twice the targeted resolution of the collimated light beam.

Additionally or alternatively, the micro-lens array can comprise moving means. Additionally the micro-lens array can be moved at a speed such that a transition between two adjacent lenses of the micro-lens array occurs in a period significantly shorter than the frame-time. Additionally the micro-lens array can be moved at a speed such that a transition between two adjacent lenses of the micro-lens array occurs during one tenth of the frame time or less. Additionally or alternatively, the movement of the micro-lens array can be along the horizontal direction or the vertical direction or both, in the plane of the micro-lens array pinhole mirror. Additionally, the amplitude of the movement can extend over a plurality of adjacent micro-lens elements, preferably at least 5. This has the advantage of reducing speckle formation and avoiding that the pin-hole mirror is being imaged.

It is also an objective of the present invention to provide a method for projecting images with a system comprising a base illumination light beam and a collimated light beam, the method comprising the steps of providing angular diversity to the collimated light beam, combining the base illumination light beam and the collimated light beam by means of the transmissive-reflective means, which has a reflective area and transmissive area, and said reflective area reflects the base illumination light beam and the transmissive areas transmit the collimated light beam, and the reflective area of the transmissive-reflective means reflects the base illumination, and the transmitting area of the transmissive-reflective means transmits the collimated light.

This has the advantage of being able to diffuse the collimated beam and blended with the illumination beam without having to diffuse and further broaden the illumination beam.

Additionally, the method can comprise a step of providing despeckling to the collimated light beam. Additionally or alternatively, the step of despeckling and of providing angular diversity can be performed simultaneously. Additionally or alternatively, the step of providing angular diversity can further comprise the step of increasing the étendue of the collimated beam until it is equal or smaller than the total étendue of the reflected illumination light beam.

This has the advantage of being able to match the combined light beam to the area of the light modulator, which reduces light loss. The increased étendue also increases eye safety.

Additionally or alternatively, the step of reflecting the base illumination light beam onto the transmissive reflective means can be performed at normal or near-normal incidence angle, or with an incidence angle of for example in the range of 20 to 35 degrees.

This has the advantage of being able to choose configuration that best suits the other parts of the system, e.g. the second light modulator.

Additionally or alternatively, the method can comprise a step of moving the means for providing angular diversity. Additionally, the moving step can be performed at a speed shorter than the frame time of the projection system, for example shorter than a tenth of the frame time. Additionally or alternatively, the method can comprise a step of modulating the collimated light beam before the step of providing angular diversity to the collimated light beam. Additionally or alternatively, the method can comprise a step of modulating the combined beam.

This has the advantage of that the collimated light beam and the illumination light beam can be modulated independently of each other.

Additionally or alternatively the method can comprise a step of providing a focused image of the combined beam in the plane of the transmissive reflective means and in the plane wherein the combined beam is modulated.

It is also an objective of the present invention to provide an arrangement of optical components for use with a first light source providing a base illumination light beam and a second light source providing a collimated light beam and for use in combining light for a projection system, the arrangement comprising a micro-lens array for providing angular diversity to the collimated light beam, and transmissive-reflective means for combining the base illumination light beam and the collimated light beam into a combined beam, the micro-lens array being positioned in the optical path of the second light source before the transmissive-reflective means, wherein the transmissive-reflective means comprises areas being reflective for reflecting the base illumination light beam and areas being transmissive for transmitting the light of the collimated light beam.

DEFINITIONS

A transmissive-reflective means is an optical device that can receive light which it is configured to partly transmit and partly reflect. It can be designed to receive light for transmission at a first side and simultaneously receive light for reflection at the second side. This can be implemented e.g. by means of pinhole mirror, i.e. a device having a reflective coating on one side and provided with pinholes having an arbitrary shape. The substrate can be transmissive, in which case the reflective coating need not be applied where the pinholes are. The substrate may also be opaque, in which case the pinholes are through the substrate and the reflective coating. Alternatively, the substrate can be transmissive, and comprise a reflective surface coating on a first side or major surface with the reflective surface coating being applied throughout. Alternatively or additionally the pinholes can be replaced- or covered with a coating which is transmissive, at least for the light received for transmission on the first side. Alternatively or additionally the coating can have dichroic or polarizing properties. If the light received for transmission for example has limited spectral content and/or is polarized, the coating covering the pinholes could still reflect the remainder of the spectrum and the orthogonal polarization from the light received for reflection. The device can comprise a highly reflective surface on the area surrounding the pinholes and/or coated parts. One could also consider a surface being selectively reflective and transmitting which is fully covering the area. A transmissive-reflective means can for example be a flat or micro-blazed pinhole mirror. Pinholes can be obtained by etching e.g. a metallic or dielectric reflective coating. Below or above the pinhole coating an additional polarizing and/or dichroic coating could be applied that is transmissive for the light coming from the collimated light beam.

A Pinhole is a small circular hole which usually has a diameter of a few microns to about a hundred microns. In embodiments of the present invention, pinholes are provided in a substrate to let light through, the diameter of the pinholes being at least the full width at half maximum of the Airy disk for the longer wavelength of the light beam associated with the pinhole. In embodiments of the present invention, an array of pinholes associated to a micro-lens array is provided, the diameter of each pinhole being preferably at least two times or at least three times smaller than the distance between two adjacent pinholes.

The pinhole mirror of the present invention is used with the collimated light beam which in embodiments of the present invention comprises a red, a blue and a green light component. Thus, the longer wavelength is the red component, for example at a wavelength of 700 nm. Thus, the Airy disk is to be calculated for the longer wavelength, i.e. 700 nm. The known formula $1.22\lambda/d$ is to be used, wherein d is the diameter of the aperture, in this case the diameter of the lenslets of the micro-lens array. However, as in embodiments of the present invention the light beam hits the pinhole mirror at an angle, the Airy disk will be increased due to the angle. Thus, it is the largest diameter of the projection of the Airy disk in the plane of the pinhole mirror which needs to be taken into account for the calculation of the smallest diameter of the pinholes.

A micro-lens array comprises an array of micro-structures (e.g. convex structures), that can act as lenses with dimensions in the sub-mm range, each lens having a focal plane.

An illumination light beam (or a base illumination light beam) has a uniform distribution of light that ideally can fill the étendue of the spatial light modulator in a projection system with as little light loss as possible.

A collimated light beam (or a steered light beam or light steering beam) comprises a highly collimated light beam that can be pointed to selected positions on the spatial light modulator where a higher illumination is needed, such as highlights.

Figure 1:
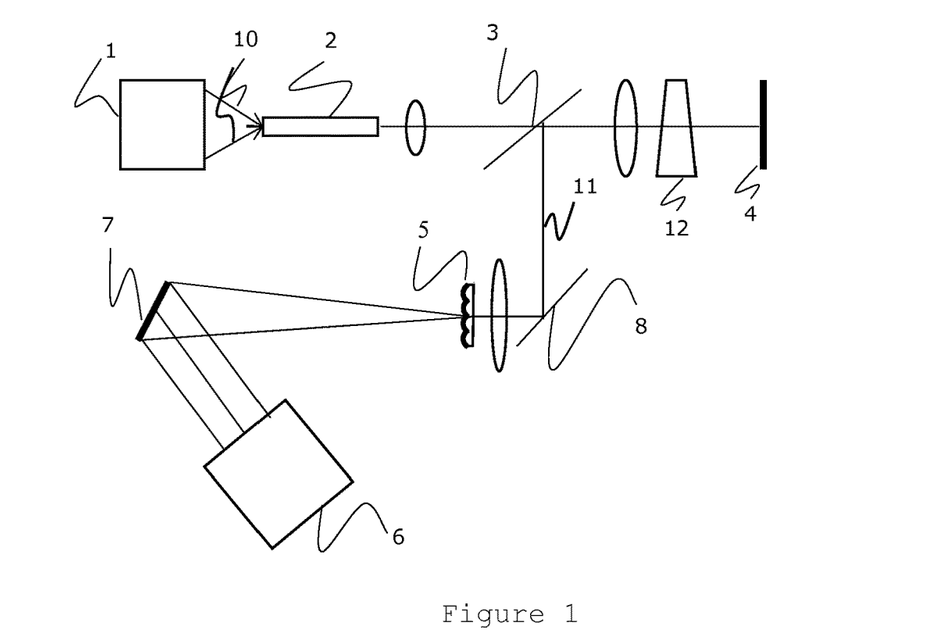
FIG. 1 shows an embodiment of the present invention.

One of the common issues with laser projection is the presence of speckles, and there are various ways to deal with speckle formation. For example, it is advantageous that both the base illumination light beam and the steered light beam each fill the complete étendue of the spatial light modulator. In this case speckle reduction is maximized and the laser safety risk is minimized for both light beams. This can be achieved by restricting the étendue of the base illumination to that of the light steering beam, and directing both illumination beams through the moving diffuser. However, it would add significant monetary cost, for example more expensive RGB laser light sources. Lower cost RGB lasers, laser-phosphor light sources and arc lamp light sources can be used for the base illumination beam if a larger étendue (but still smaller than the étendue of the spatial light modulator) is accepted. However, if such an illumination beam is sent through the diffuser at the intermediate image plane of the collimated light beam, its étendue would become too large. Thus, it would be better to combine the images after diffusing the collimated light beam, as shown in FIG. 1.

Resolution of a Micro-Lens Array

A micro-lens array is a one- or two-dimensional array of lenses where the diameter of each lens is normally in the sub-mm range. The resolution of the micro-lens array is the distance between two neighbouring elements in the array, for example at their respective centres.

Resolution of a Light Such as a Collimated Light Beam

The resolution of the collimated light beam can be represented by the smallest area that the light beam can occupy on the final image. This value may be expressed as a ratio to the total image area.

DETAILED DESCRIPTION OF THE INVENTION

The present invention will be described with respect to particular embodiments and with reference to certain drawings but the invention is not limited thereto but only by the claims. The drawings described are only schematic and are non-limiting.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein. The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B. Similarly, it is to be noticed that the term "coupled", also used in the description or claims, should not be interpreted as being restricted to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

FIG. 1 shows an embodiment of the present invention where the base illumination source 1 providing a base illumination light beam 10, which enters, for example beam-shaping optics which can be used to provide uniform illumination over the area of the spatial light modulator. For example the light beam 10 can enter a base illumination integrator 2, and can be further transmitted by a dichroic mirror 3. A second light beam is provided by a phase modulator illumination light source 6 which can provide a collimated light beam 11, after passing a phase modulator 7 and a moving diffuser 5 (located at an intermediate image plane). The moving diffuser 5 can act as or contribute to a despeckling device. The base illumination light beam 10 and the collimated light beam are blended, or combined, by a beam combiner such as by the dichroic mirror 3 which transmits the first base illumination light beam 10 and reflects the collimated light beam 11. The combined beam can also further enter a polarization scrambler 12 before it reaches the spatial light modulator 4. The system can also comprise one or more imaging lenses (not numbered in FIG. 1).

One way of reducing or contributing to the reduction of laser speckle of the light steering beam 11 in the light steering path is to use a moving diffuser 5 in an intermediate image plane. If a micro-lens array, with optionally a pinhole mirror, is used as a diffuser, moving this component can also help reducing visibility of the individual micro-lens elements and/or pinholes in the final image.

It is presently, however, difficult to design dichroic filters or mirrors for unpolarized light, especially in combination with a light beam having a large variance in angle of incidence and having filtering means with steep wavelength edge characteristics (roll-off). Further, using a polarizing beam splitter in a first case or a dichroic beam combiner in a second case imposes restrictions on the choice of the light source 1 for the base illumination. For example, in the first case, the dichroic filter or mirror might have to support polarized light, whereas in the second case it might need to have a narrow spectrum. In the first case, when the light source is unpolarized, polarization recuperation can be implemented to minimize the light loss, but this would double the étendue of the beam. In the second case, if the light source comprises a broadband spectrum, spectral separation can be achieved by filtering, but this would reduce the intensity of the light output. Additional complications arise if the system should be able to handle color 3D imaging.

Therefore, a better approach would be to combine the light beams, without using any filters, at a location where the étendue of the collimated light beam is still small. But this may conflict with the need to expand the angular space of the collimated light beam to the full étendue of the spatial light modulator:

If the combination of the base illumination light beam 10 and the collimated light beam is performed before diffusing, the étendue of the base illumination will be expanded beyond the étendue of the spatial light modulator, and light will be lost from the base illumination light beam.

If diffusing is performed before the combination of the base illumination light beam 10 and the collimated light beam, the sum of the étendue of the light beams will be double of what the spatial light modulator can accept, and light will be lost from either the base illumination light beam or the collimated light beam, or even both.

Embodiments of the present invention can use a micro-lens array instead of a diffuser to introduce the angular diversity in the light steering beam. Hence the micro-lens array is an example of an angular diversity generator. The micro-lens array can preferably also reduce the speckles in the light steering beam as well. Hence the micro-lens array is an example of or can contribute to a despeckling device. Despeckling can be improved by moving the micro-lens array itself The micro-lens array can focus the collimated light beam in a plurality of small spots. The light steering beam and the base illumination beam can be combined without increasing the étendue. This can be obtained by providing a transmissive-reflective means, for example a pinhole mirror, at the position of the focus points so that the focus of the collimated beams coincides with the transmissive parts, i.e. pinholes, of the transmissive-reflective means.

Patent U.S. Pat. No. 6,094,294 discloses an optical modulator device comprising a micro lens array that focuses modulated light onto a pinhole array. However, the pinhole array is used to transmit light when the optical modulator remains undeformed and to block unwanted light to reach the screen. Thus, there is only one conventional illumination light beam in use and there is no teaching how the pinhole array can manage incoming illumination light differently from the focused light.

The resolution of the micro-lens array is preferably sufficiently high, at least two times, and preferably at least 10 times higher than the resolution of the light steering beam (see definitions section above), in order not to limit the resolution of the light steering beam. The minimum area of the collimated beam on the projected image can be about 10% of the total image area.

For example: The width of the collimated beam on the projected image can be about 10% of the total image width. For a 4 k display, which has 4000×2000 pixels, this would mean 400×400 pixels (as it is assumed the spots are round). One pixel is about 7.6 micron, thus 400 pixels is about 3 mm. The lens pitch should be at least 10 times smaller than the smallest highlight dimension (resolution). Thus, in the present example, one could choose a lens pitch of 0.1 mm, making the lens pitch 30 times smaller than the smallest highlight dimension.

In order to maintain proper alignment between the micro-lens array and the pinholes, it is preferred to integrate the two elements within the same optical part or substrate. A penalty with such an arrangement would be some light loss where the base illumination couples through the pinholes, but this would be far less than the light losses mentioned above because of the étendue mismatch. The mirror can be a dichroic mirror, for example reflecting more than 95% and preferably more than 98% of the light. For this configuration to work well, the light coming from the light steering would need to remain as collimated as possible. The pinhole has is preferably sufficiently large to accommodate the angular variation in the collimated light beam and sufficiently small to disturb as little as possible the reflection of the base illumination light beam. It is preferred to reflect as much as possible of the base illumination light beam. The pinhole size dimensions can depend on the system configuration, for example the worst-case angle of the collimated light beam impinging on the pinhole. For example assuming worst-case angles of +/−2 degrees (with respect to the nominal incident angle, for a blazed configuration (e.g. including a micro-blazed mirror 56, see FIG. 3b) this would be normal incidence +/−2°, for the other configurations it would be 24°+/−2°) a micro lens pitch of 100 micron and a substrate thickness of 0.5 mm a pinhole size between 30 and 45 micron is suitable. This means that 7% till 16% of the total area is pinhole area, or in other words 93% till 84% of the total area is reflective.

In general, the smallest dimension of the pinhole allowable corresponds to the size of the Airy disk. However, the angle of the collimated light beam impinging on the pinhole is to be taken account. For example, the size of the Airy disk to be taken into account is the print of the Airy disk on the substrate which is tilted with respect to the optical axis.

The dimensions of the diameter of the pinholes are preferably at least two times or at least three times smaller than the distance between two adjacent pinholes.

The pinhole can further have the function of filtering out higher order diffraction. As light coming in at an angle larger than the acceptance angle of +/−2 degrees versus the nominal incident angle will not pass through the pinhole.

Figure 2:
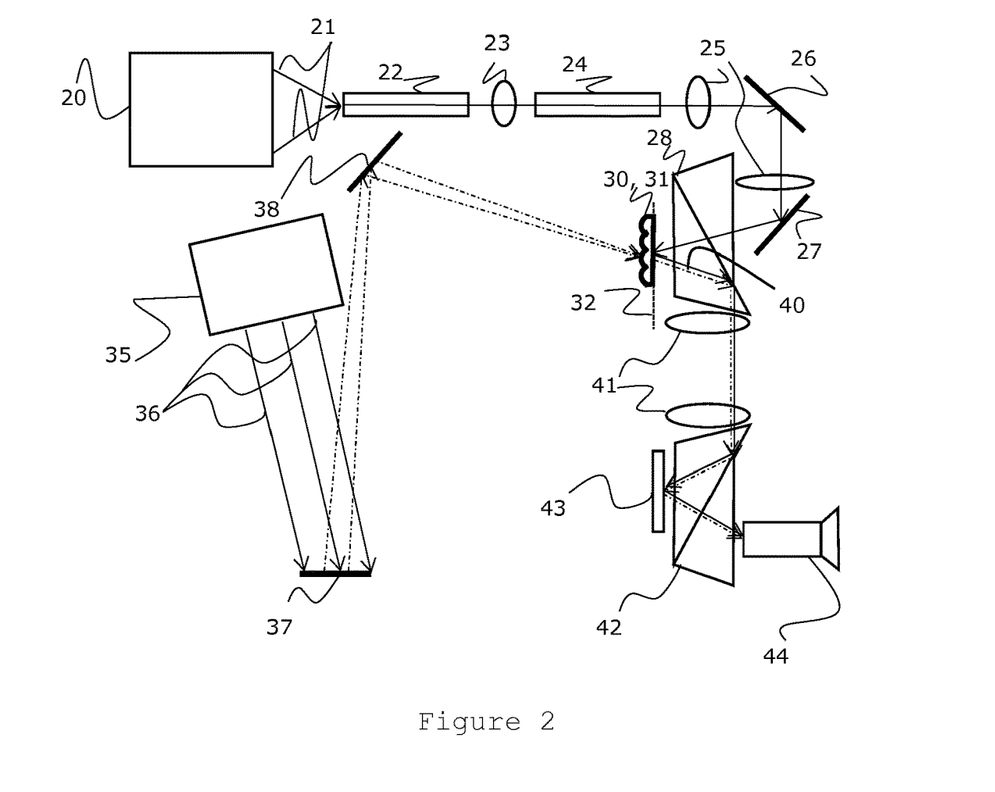
FIG. 2 shows an embodiment of the present invention comprising the combination of a base illumination light beam and a collimated light beam at an angle relative to the normal of the beam combining component.

FIG. 2 shows an embodiment of the present invention. The base illumination light source 20 generates a light beam 21, which can enter beam-shaping optics. For example the light beam 21 can enter an integrator rod 22, a relay lens 23, a second integrator rod 24, illumination optics 25, and is then reflected by a folding mirror 26, is reimaged by another illumination optics 25, another folding mirror 27, and enters a first total internal reflection (TIR) prism 28, and is then reflected by transmissive-reflective means. The transmissive-reflective means can be a pinhole mirror 31, located in an intermediate image plane 32. The phase modulator illumination light source 35 provides the collimated light beam 36 which is incident on the phase modulator 37, the light leaving the phase modulator being reflected by a folding mirror 38 towards the micro-lens array 30 which operates as an angular diversity generator. The light is then transmitted by a pinhole mirror 31. The micro-lens array operates as part of a beam combiner. The micro-lens array 30 focuses the collimated light so that the micro-beams can be transmitted through the pinholes in 31. The reflected illumination light and the transmitted collimated light can leave the pinhole mirror 31 as one combined beam 40, wherein the combined beam has reduced speckles and has an étendue which corresponds to the largest étendue of the first and second beam. Hence the micro-lens array can also act as, or act as part of a despeckling device. The combined beam 40 is reflected by the TIR surface of the TIR prism 28. The beam 40 then enters the illumination imaging optics 41, and is reflected by the TIR surface of a second TIR prism 42, advantageously arranged anti-symmetrically to the first TIR prism 28. The beam then falls onto the spatial light modulator 43, passes the second TIR prism 42 again and finally reaches the projection lens 44.

Note that the anti-symmetrical TIR prism setup is used to image the intermediate image of the collimated light+base illumination onto the second DMD modulator 43. The advantage of this symmetrical TIR prism setup, comprising the first TIR 28 and the second TIR 42 wherein the first and second TIR are arranged as mirror images of one another (with respect to an axis perpendicular to the optical axis and located between the two TIR prisms), is that the intermediate image plane 32 is parallel to the DMD 43, such that a good focus (or a controlled amount of defocusing) can be achieved over the entire DMD.

Due to the anti-symmetric arrangement of the TIR prisms and the corresponding transmissive reflective means and the second light modulator, the angle of incidence of the base illumination light beam on the transmissive-reflective means and the angle of incidence of the combined beam on the second spatial light modulator are the opposite of one another (+X and −X), and correspond, in a preferred embodiment, to two times the tilt angle of the second spatial light modulator.

The base illumination light source 20 can be a conventional laser light source such as a cluster followed by a double integrator system 23, 24 as described elsewhere, e.g. in WO2012139634A1. The exit of the second integrator 24 can be imaged, by means of imaging optic elements 25, 26, 27 and 28, onto the intermediate image plane 32 where a pinhole mirror 31 can be placed. Unlike a conventional illumination system for a DMD, the light enters from the front of the TIR at an angle, and can thus be reflected towards the second modulator 43 at the corresponding negative angle. Most DMD chips can operate by tilting the individual mirrors to reflect the incoming light either onto the projection lens or away from the projection lens (e.g. to a heat sink). The tilting angle can for example be in the range of 10° to 12°. For example, with current DMD devices the tilt angle is 12 degrees, thus the optimal illumination angle is 24 degrees. Other common tilt angles are for example 10 or 17 degrees. Since the illumination angle should be the double of the tilt angle, 20 to 35 degrees is a preferred range.

The light can then impinge on the TIR with an angle larger than the tilt angle, for example the double of the tilt angle, in order to collect all the light. The collimated light beam can be used to provide a "highlight image" at parts of the image where light or more light is present, primarily where it is needed, so it is important that this image can be correctly transferred to the DMD chip (or light modulator). Since embodiments of the present invention makes it possible to have the light impinge onto the DMD chip (or light modulator) with an angle, this transfer can be performed with a high precision. The illumination light beam also benefits from this tilt since it enables a better match between the light beam cross section and the area of the DMD chip (or light modulator) so that almost no light falls outside of it. Although some defocusing can be advantageous (e.g. to smoothen out artefacts in the highlight image as well as the microlens array and pinhole structure) it is preferred that the amount of defocusing is constant over the area of the DMD. The micro-lens array is now at an angle relative to the normal of the optical axis, but this effect can be compensated for when calculating the phase patterns.

Figure 4:
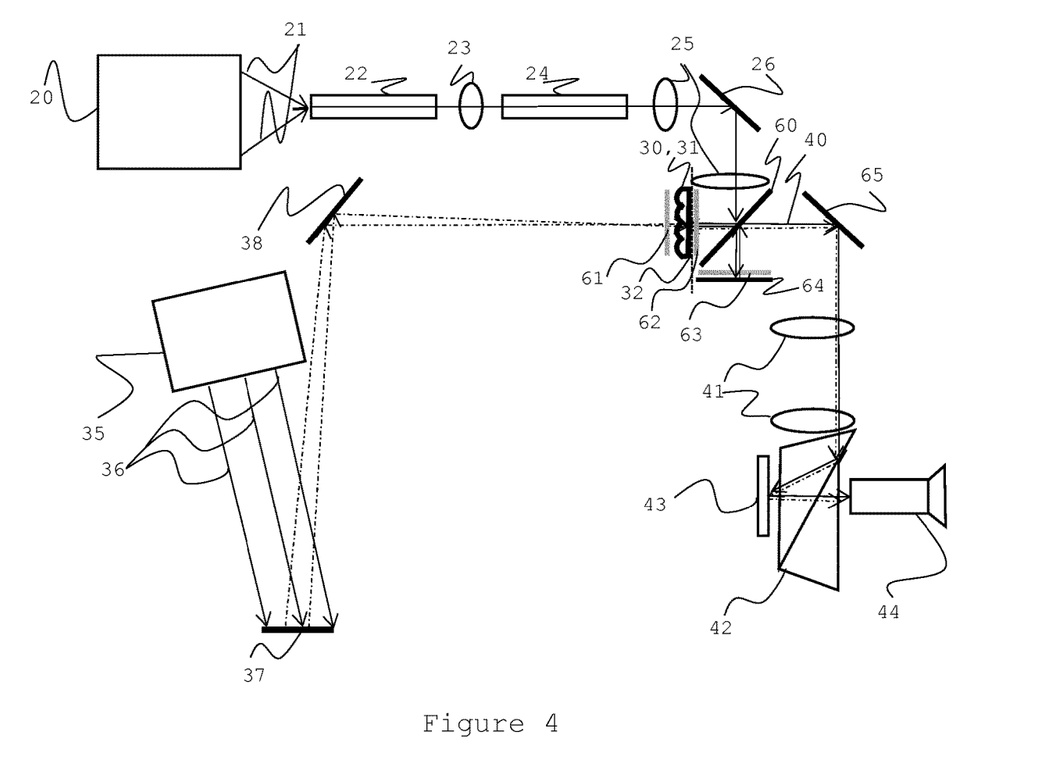
FIG. 4 shows an embodiment of the present invention comprising the combination of a base illumination light beam and a collimated light beam at a direction normal to the beam combining component.

FIG. 4 shows an alternative embodiment of the present invention. In this embodiment the base illumination is combined with the highlight illumination at a zero degree incident angle on the transmissive-reflective means 31 and on the micro-lens array 30 respectively.

The base illumination light source 20 generates a light beam 21, which can enter beam-shaping optics. For example, the light beam 21 enters an integrator rod 22, a relay lens 23, a second integrator rod 24, illumination optics 25, and is then reflected by a folding mirror 26, to be reimaged by another illumination optics 25 onto the intermediate image plane 32. The base illumination beam is split into two orthogonal polarizations by a PBS (Polarization Beam Splitter) 60.

A first polarization direction of the base illumination beam passes through a first quarter wave retarder 62 and is then reflected by transmissive-reflective means comprising a pinhole mirror 31, and located in an intermediate image plane 32. The returned reflected base light passes through the first quarter wave retarder 62 once more and the polarization direction is rotated by 90° by the double pass via the first quarter wave retarder 62 such that the light now passes through the PBS 60.

A second polarization direction of the base illumination beam passes through the PBS 60 to a second quarter wave retarder 63 and is then reflected by mirror 64. The returned reflected base light passes through the second quarter wave retarder 63. Since the polarization direction is now rotated by 90° by the double pass via the second quarter wave retarder 63, the light is now reflected by PBS 60. Finally, both polarization directions of the base illumination beam are combined again into combined beam 40.

The phase modulator illumination light source 35 provides the collimated and linearly polarized light beam 36 which falls on the phase modulator 37, the light leaving the phase modulator is reflected by a folding mirror 38 towards the micro-lens array 30 and is then transmitted by the pinhole mirror 31. The micro-lens array 30 focuses the collimated light so that the micro-beams can be transmitted through the pinholes of the pinhole mirror 31. A third quarter wave retarder 61 with the orientation of its slow axis orthogonal to the first quarter wave retarder 62 is added to maintain the linear polarization of the highlight illumination beam such that it remains properly polarized for the beam to pass PBS 60. The reflected first part of the illumination light and the transmitted collimated light can leave the pinhole mirror 31. The second part of the illumination light is added after the PBS 60 and all the light is combined into one beam 40, wherein the combined beam has reduced speckles and has an étendue which corresponds to the largest étendue of the first and second beam. Hence the optical components mentioned above provide an angular diversity generator and a despeckling device. The beam 40 then enters the illumination imaging optics 41 via folding mirror 65 and passes a TIR prism 42 such that the beam falls onto the spatial light modulator 43. It then passes the TIR prism 42 again and finally reaches the projection lens 44.

Note that if the collimated highlight illumination beam has a different polarization, that the position of the full mirror 64 and the pinhole mirror 31 can be interchanged. At the same time, the position of the micro-lens array 30 follows the position of the pinhole mirror 31. If desired, two highlight beams can be provided with orthogonal polarizations and micro-lens arrays and pinhole mirrors are provided at both position 64 and position 31. This can be useful to increase the total power in the highlight beam.

Note that in the setup of FIG. 4, the intermediate image plane 32 and the imager 43 are no longer parallel, which will degrade somewhat the focus quality of the highlights at the position of the imager 43, especially in the corners. However, the fact that the beams remain on axis will reduce the complexity and size of the illumination optics 25 and the illumination imaging optics 41.

The micro-lens array 30 can be designed to operate as an angular diversity generator in any embodiment. For example the micro-lens array 30 can introduce an angular range spread similar to the angular spread in the base illumination (or a similar f-number). The pinhole mirror 30 can have pinholes aligned with the point where the light focuses (for the particular angle of incidence). The micro-lens array can be moved at a speed such that a transition between two adjacent lenses in the micro-lens array elements happens in a period significantly shorter than the frame-time (e.g. during one tenth of the frame time or shorter); Movement can be introduced in both x (horizontal) and y (vertical) direction in the plane of the micro-lens array pinhole mirror. This is in order to avoid objective and subjective speckle, and a fixed pattern of brightness variations due to the micro-lens array and pinhole elements. Hence the micro-lens array and pin-hole elements can be designed to operate as a despeckling device in any embodiment of the present invention. Preferably the amplitude of the movement extends over several adjacent micro-lens elements (e.g. 5 or more lens elements) to average out the brightness over several lenslet pinhole combinations thus becoming less susceptible to small imperfections. In addition to the movement, the image of the micro-lens array 30 may be kept from being in sharp focus at the second modulator 43 so that the focus plane can be slightly displaced relative to the plane of the second modulator 43. This allows the light from adjacent micro-lens array elements to be mixed, and the pinholes to become less visible in the final projected image. Preferably, the micro-lens array can be placed slightly outside of the intermediate image plane. For example, the focus shift would preferably be more than 2.5 times the distance between adjacent pinholes, but, for example no more than 10 times.

The displacement of a diffuser is related to e.g. the dimensions of the lens resolution (as explained above). To make sure there is good coverage, a measure of e.g. 5 times of the lens pitch can be used. In the above example the lens pitch was 0.1 mm, thus the displacement of the diffuser should cover 5×0.1 mm=0.5 mm. The frequency can be calculated as follows: If the frame rate frequency is 60 Hz and the DMD mirror can support 64 bitplanes in one frame (this is limited by physics of the DMD micro mirrors and limitations of the drive circuitry), then $\frac{1}{64} \times \frac{1}{60}$ sec is the minimum time the DMD samples the light, ideally the displacement of the micro lens array diffuser is a least 1 lens element during this period to have complete brightness averaging. So if the diffuser moves over 5 lens elements, it should move at a frequency higher than 768 Hz (60×64/5).

However artefacts can and will be smaller than 1 LSB, therefore even at slower speeds artefacts are not expected to become visible. Especially in combination with defocused imaging of the pinhole mirror onto the DMD imager (which also spreads out the light from the pinhole and mixes between adjacent lenslet elements and pinholes).

Figure 3A:
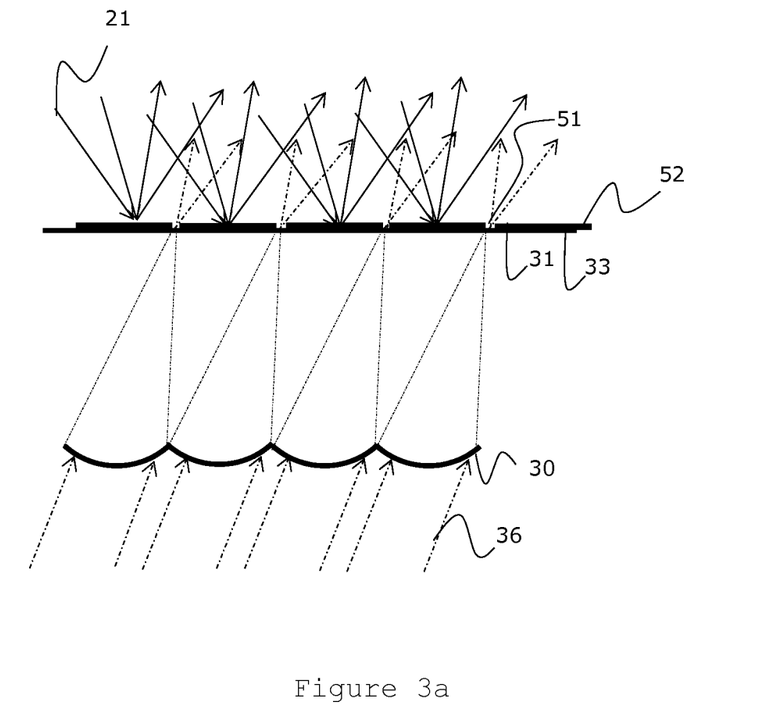
FIG. 3a shows a micro-lens array in combination with transmissive-reflective means according to an embodiment of the present invention.

A close-up of the micro-lens array in combination with a pinhole mirror 31 is shown in FIG. 3a. The pinhole mirror 31 comprises a reflective mirror layer 52 and a plurality of pinholes 51. The number of pinholes corresponds to the number of micro-lenses. The illumination light beam 21 impinges on the mirror-side of the pinhole mirror and gets reflected by the mirrors 52. The collimated light beam 36 enters the micro-lens array 30, here under an angle, and each micro-lens array element can focus the received light beam onto the pinholes 51 so that the focus point lies within the pinhole.

Figure 3B:
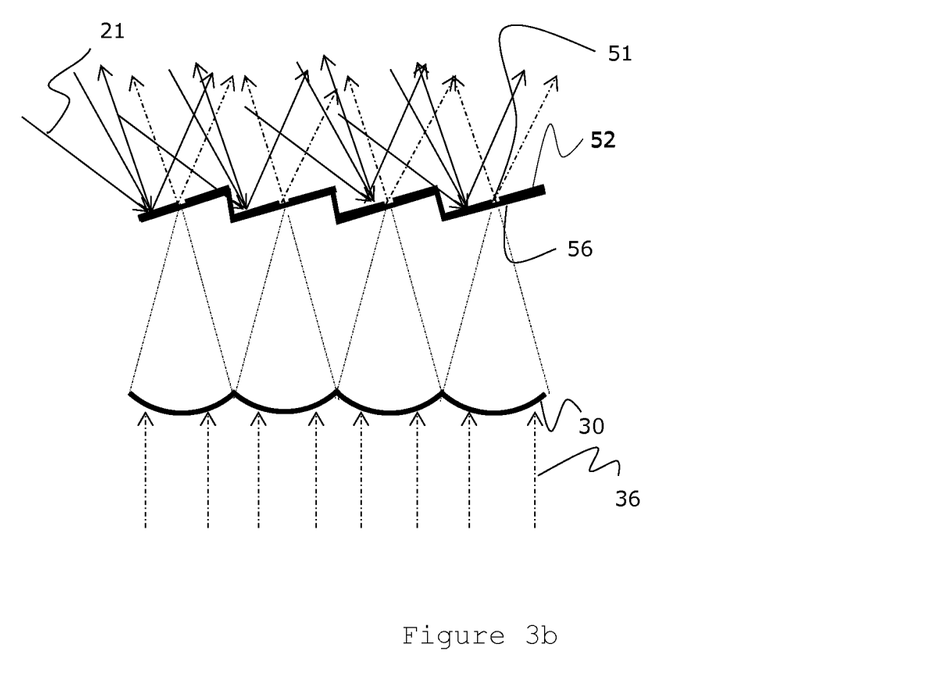
FIG. 3b shows a micro-lens array in combination with transmissive-reflective means, comprising a micro-blazed pinhole mirror, according to an embodiment of the present invention.

In an alternative embodiment, the flat pinhole mirror can be replaced by a micro-blazed pinhole mirror 56, as shown in FIG. 3b. When the second modulator is a DMD modulator, the blaze angle would preferably be chosen to be identical to the tilt angle of the micro-mirrors of that second modulator.

In another embodiment of the present invention, other despeckling devices can be used, e.g. in addition. For example, the first modulator can also be used to reduce the speckles, in combination with the transmissive-reflective means described above or separately. The phase modulator can be a MEM's device. The first modulator can be used both for light steering and as a means to reduce the objective laser speckle by varying the positions over time, such that by time averaging of different speckle patterns over the integration time of the human visual system, the perceived objective speckle is reduced.

Such despeckling method or despeckling device could for example be implemented with a light steering PTT (piston tip tilt) MEM's device as a modulation of the Piston function while maintaining the same horizontal and vertical Tilt positions. This would mean that the three actuators below a single mirror element receive common semi-random modulation signal.

Alternatively, another despeckling method or despeckling device can be used. For example, a very minor semi-random modulation of the tilt could be adequate to reduce the objective speckle while causing negligible shift in the brightness pattern. A displacement of a few microns would not significantly affect the brightness distribution on the second modulator.

Alternatively, another despeckling method or despeckling device can be used. For example, it is also possible to generate a sequence of driving signals that in an alternative manner deliver the desired brightness patterns (e.g. multiple solutions are possible to deliver an adequate result). Each driving situation will result in a different speckle pattern and time averaging over multiple speckle patterns will reduce the perceived objective speckle. The disadvantage of this approach is that while the first modulator is transitioning from one pattern to the next that the brightness pattern on the second modulator is transitioning as well. And as the brightness at this point is unknown the second modulator should be switched to black (dark time).

Figure 5:
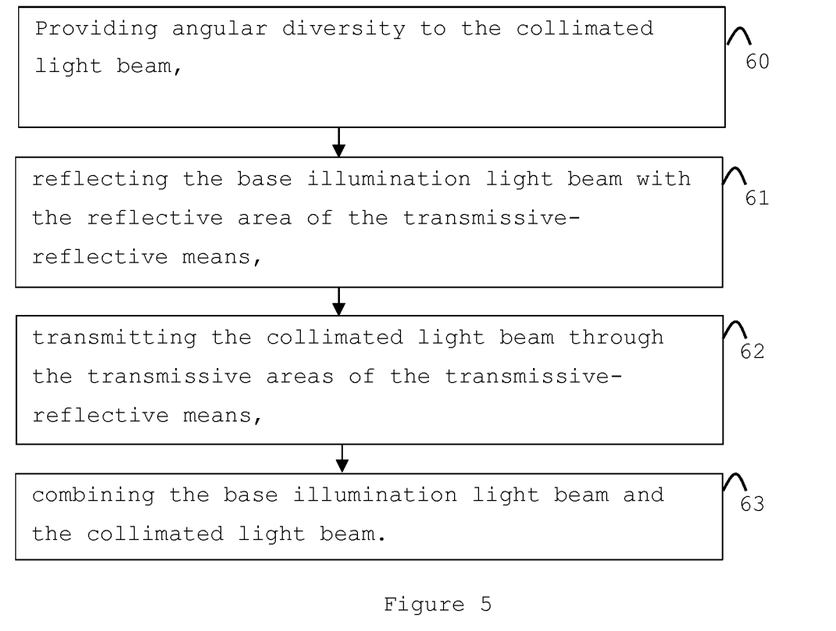
FIG. 5 shows a method flow as used in embodiments of the present invention.

FIG. 5 shows a flow chart illustrating a method that is used in any of the embodiments of the present invention. In step 60, angular diversity is provided to the collimated light beam, for example by means of a micro-lens array. As can be seen in FIG. 3a) or b), the collimated light beam and the base illumination light beam impinges on the transmissive-reflective means from opposite directions. The base illumination beam is impinging onto the reflective area of the transmissive-reflective means, which in step 61 is reflecting the base illumination beam. Also to be seen in FIG. 3a) or b), the collimated light beam is impinging onto the side opposite the reflecting side. The transmissive-reflective means is now transmitting the collimated light beam (step 62) and combining it with the base illumination light beam (step 63).

The invention claimed is:

1. A system for combining light for a projection system comprising:
   a first light source providing a base illumination light beam,
   a second light source providing a collimated light beam,
   a micro-lens array for providing angular diversity to the collimated light beam, and
   transmissive-reflective means for combining the base illumination light beam and the collimated light beam into a combined beam,
   the micro-lens array being positioned in the optical path of the second light source before the transmissive-reflective means,
   wherein the transmissive-reflective means comprises areas being reflective for reflecting the base illumination light beam and areas being transmissive for transmitting the light of the collimated light beam, the transmissive parts of the transmissive-reflective means being in a plane wherein a focus point of each micro-lens of the micro-lens array lies within the plane of the transmissive parts of the transmissive-reflective means.

2. The system according to claim 1, further comprising a despeckling device for despeckling the collimated light beam.

3. The system according to claim 2, wherein the despeckling device is in at least part provided by the micro-lens array which can be movable or stationary.

4. The system according to claim 1, wherein the focus point of each micro-lens is aligned with the transmissive parts of the transmissive-reflective means.

5. The system according to claim 1, wherein the transmissive-reflective means comprises a pinhole mirror comprising a transmissive or opaque substrate having a reflective coating on the first side and pinholes through the substrate and/or coating, and wherein each pinhole is associated with a micro-lens of the micro-lens array.

6. The system according to claim 5, wherein the micro-lens array and the transmissive-reflective means are arranged such that the focus position of each micro-lens is in its associated pinhole.

7. The system according to claim 6, wherein a diameter of the pinholes is at least two times or at least three times smaller than the distance between two adjacent pinholes and of at least the projection of the Airy disk in the plane of the transmissive-reflective means corresponding to the longer wavelength of the collimated light beam.

8. The system according to claim 1, wherein the micro-lens array is configured such that the étendue of the collimated light beam transmitted through the transmissive-reflective means is equal to- or smaller than the étendue of the base illumination light beam reflected by the transmissive-reflective means.

9. The system according to claim 1, further comprising a first spatial light modulator for modulating the light beam of the collimated beam before the micro-lens array.

10. The system according to claim 1, further comprising a second spatial light modulator for modulating the combined light beam.

11. A method for projecting images with a system comprising a base illumination light beam, and a collimated light beam, the method comprising the steps of:
   providing angular diversity to the collimated light beam using a micro-lens array,
   combining the base illumination light beam and the collimated light beam with transmissive-reflective means, the transmissive-reflective means comprising a reflective area and transmissive area,
   wherein the step of combining is performed by reflecting with a reflective area of the transmissive-reflective means the base illumination light beam and transmitting with the transmissive areas of the transmissive-reflective means collimated light beam, the transmissive parts of the transmissive-reflective means being in a plane wherein the focus point of each micro-lens of the micro-lens array lies within the plane of the transmissive parts of the transmissive-reflective means.

12. The method according to claim 11, further comprising the step of providing despeckling to the collimated light beam.

13. The method according to claim 12, wherein the step of despeckling and of providing angular diversity are performed simultaneously.

14. The method according to claim 11, wherein the step of providing angular diversity further comprises the step of increasing the etendue of the collimated beam until it is equal or smaller than the total etendue of the reflected illumination light beam.

15. The method according to claim 11, wherein the step of reflecting the base illumination light beam onto the transmissive reflective means is performed with an angle, for example in the range of 20 to 35 degrees.

16. The method according to claim 11, wherein the step of reflecting the base illumination light beam onto the transmissive reflective means is performed at or near normal incidence.

17. The method according to claim 11, further comprising the step of moving the means for providing angular diversity.

18. The method according to claim 11, further comprising the step of modulating the combined beam.

19. The method according to claim 11, further comprising the step of providing a focused image of the combined beam in the plane of the transmissive reflective means and in the plane wherein the combined beam is modulated.

20. An arrangement of optical components for use in combining light for a projection system having a first light source providing a base illumination light beam and a second light source providing a collimated light beam, the arrangement comprising:

a micro-lens array for providing angular diversity to the collimated light beam, and transmissive-reflective means for combining the base illumination light beam and the collimated light beam into a combined beam, the micro-lens array being positioned in the optical path of the second light source before the transmissive-reflective means, wherein the transmissive-reflective means comprises areas being reflective for reflecting the base illumination light beam and areas being transmissive for transmitting the light of the collimated light beam.

* * * * *